UNITED STATES PATENT OFFICE.

JOHN THOMPSON DORRANCE, OF CINNAMINSON, NEW JERSEY, ASSIGNOR TO JOSEPH CAMPBELL COMPANY, A CORPORATION OF NEW JERSEY.

PREPARING FRUIT PRODUCTS.

1,068,746.  Specification of Letters Patent.  Patented July 29, 1913.

No Drawing.   Application filed August 31, 1912.   Serial No. 718,103.

*To all whom it may concern:*

Be it known that I, JOHN T. DORRANCE, a citizen of the United States, residing at Cinnaminson, in the county of Burlington and State of New Jersey, have invented new and useful Improvements in Preparing Fruit Products, of which the following is a specification.

In the preparation of fruit products and especially tomato products, catchup, soup, etc., for example, the normal acidity of the fruit is often objectionable, particularly where milk is added, while the preservation, so far as is possible, of the brightness of the natural color is highly desirable. Alkaline material has been added to lessen acidity, but this darkens the color and is otherwise objectionable. It is also true that the amount of juice normally present in the fruit exceeds the amount desirable in forming most products, and it is usual to eliminate a considerable part of the juice by boiling; but this, again, greatly darkens the color. The desired color may be restored by the use of coloring matter, but this expedient has found little favor with the better class of manufacturers of such products, and is not permitted to others.

The object of this invention is to avoid all the evils suggested, without introducing others, and with this end in view, advantage is taken of the fact that the juice of tomatoes contains the greater part of the acid, and that it is therefore possible to remove, mechanically, at the same time, both the excess of liquid and the excess of acid. It is also borne in mind that the red pulpy matter immediately within the very thin skin of the fruit should be retained although it can hardly be separated without the aid of heat. Accordingly the fresh fruit is washed and freed from any undesirable parts, and then, preferably after some mechanical disintegration of the fruit, and with or without prior slight and rapid cooking, a considerable proportion, preferably about 25%, of the juice is removed mechanically, either by pressure or simple drainage. Provision should be made for retaining sustantially all the solid matter, however, either by using a filter press, or by straining or filtering the separated liquid and returning the solids to the main mass. This mass if not before cooked is now heated quickly, preferably by steam, to destroy germs and detach the peripheral red pulp from the skins, and both seeds and skins are then removed from the mass, usually by centrifugal force or by the commonly employed "cyclone" apparatus. From the resultant mass a further amount of juice, preferably about 25% of the original mass, is mechanically removed by the method first employed. There remains a more or less thick pulpy mass, suitable for stock to be used in a variety of finished products, and this mass is bright in color and not undesirably acid in character.

The process, after the fruit is washed, is very rapid and may be practically continuous and with air substantially excluded.

Where the resultant stock is to be used at once, the cooking may be merely subjecting the whole fruit to heat enough to soften the red pulp beneath the skin, the germ destroying heat being applied when the stock is used, or deferred and applied to the finished product. In this case the body of the fruit is not necessarily heated at all in the preparation of the stock. In any case, there is no material removal of liquid by evaporation, and in fact the entire operation is too brief to permit such evaporation.

What I claim is:

1. The process of preparing fruit products from acid-containing fruit, which process comprises a combination of two steps, quickly cooking to avoid discoloration, and mechanically removing a large proportion of the acid-containing juice.

2. The process of preparing tomato products which comprises thoroughly cooking the tomatoes quickly to avoid discoloration, and mechanically removing a large proportion of the acid-containing juice, to obtain a comparatively thick sterilized pulp of bright color.

3. The process of preparing tomato products which comprises thoroughly cooking the tomatoes quickly to avoid discoloration, mechanically removing the skins, seeds and a large proportion of the acid-containing juice, to obtain a comparatively thick sterilized pulp of bright color.

4. The process of preparing tomato products which comprises mechanically eliminating a part of the juice, quickly cooking without material evaporation, removing the skins and seeds, and mechanically eliminating a further portion of the juice.

5. The process of preparing tomato products, which process comprises the step of cooking, in combination with the following steps, mechanically removing a part of the acid-containing juice, settling and draining off liquid from the pulpy mass thus obtained, recovering from the drained liquid any pulp therein, and uniting this pulp and the pulp obtained by draining.

In testimony whereof I have hereunto set my hand in presence of two subscribing witnesses.

JOHN THOMPSON DORRANCE.

Witnesses:
ANNA J. KIRBY,
J. L. ELBERSON.